(12) United States Patent
Zarders et al.

(10) Patent No.: US 11,384,590 B2
(45) Date of Patent: Jul. 12, 2022

(54) AUTOMATIC TAILGATE OPERATION

(71) Applicant: Indiev, Inc, Los Angeles, CA (US)

(72) Inventors: Mitchell Zarders, Los Angeles, CA (US); Ashkan Hadian, Los Angeles, CA (US)

(73) Assignee: INDIEV, INC., Los Angeles, CA (US)

( * ) Notice: Subject to any disclaimer, the term of this patent is extended or adjusted under 35 U.S.C. 154(b) by 734 days.

(21) Appl. No.: 16/377,537

(22) Filed: Apr. 8, 2019

(65) Prior Publication Data

US 2020/0318413 A1 Oct. 8, 2020

(51) Int. Cl.
| | |
|---|---|
| *E05F 15/76* | (2015.01) |
| *E05F 15/77* | (2015.01) |
| *H04W 4/80* | (2018.01) |
| *H04W 4/02* | (2018.01) |

(52) U.S. Cl.
CPC .............. *E05F 15/76* (2015.01); *E05F 15/77* (2015.01); *H04W 4/025* (2013.01); *H04W 4/80* (2018.02); *E05Y 2900/546* (2013.01)

(58) Field of Classification Search
CPC ...... E05F 15/76; E05F 15/77; E05Y 2400/66; E05Y 2900/546; H04W 4/021; H04W 4/023; H04W 4/025; H04W 4/44; H04W 4/80

See application file for complete search history.

(56) References Cited

U.S. PATENT DOCUMENTS

| | | | | |
|---|---|---|---|---|
| 7,688,179 | B2 * | 3/2010 | Kurpinski | G07C 9/00309 340/4.1 |
| 2014/0152422 | A1 * | 6/2014 | Breed | B60R 25/25 340/5.52 |
| 2014/0156112 | A1 * | 6/2014 | Lee | G08C 17/00 701/2 |
| 2014/0169139 | A1 * | 6/2014 | Lee | G08C 17/00 367/197 |
| 2015/0142209 | A1 * | 5/2015 | Breed | G08G 1/096716 701/1 |
| 2016/0117866 | A1 * | 4/2016 | Stancato | G07B 15/00 705/13 |
| 2017/0293991 | A1 * | 10/2017 | High | B64C 39/024 |
| 2018/0260778 | A1 * | 9/2018 | Mazetti | G01C 21/206 |
| 2019/0244167 | A1 * | 8/2019 | Kaneko | G06Q 10/0833 |

* cited by examiner

*Primary Examiner* — Tyler J Lee
(74) *Attorney, Agent, or Firm* — Buchalter, a Professional corporation

(57) ABSTRACT

Methods and systems for automatically opening the tailgate of a vehicle without any interaction with a smartkey or the vehicle itself are provided. The tailgate can be opened automatically by utilizing location data of the vehicle and remote key or smartkey proximity to the vehicle, in tandem with location data and mobile payment information of a user's mobile device. Instead of having to manually open the tailgate, place a foot under the tailgate, press a button on a remote key fob, or press a trunk-release button on the tailgate or key fob, the tailgate can automatically open as the user approaches the vehicle.

20 Claims, 4 Drawing Sheets

AUTOMATIC TAILGATE OPERATION

BACKGROUND

Opening the tailgate or trunk door on a vehicle can sometimes be difficult or inconvenient. For example, if a user of the vehicle is carrying bags or boxes, it may not be easy to open the tailgate. Mechanisms to open the tailgate have been developed to address this issue. These include hands-free power tailgate systems from Hyundai Motor Co. (U.S. Patent Application Publication No. 2014/0156112 and U.S. Patent Application Publication NO. 2014/0169139), a hands-free vehicle door opener from Denso International America Inc. (U.S. Pat. No. 7,688,179), and a foot-activated tailgate system from Ford Motor Corporation (e.g., https://newatlas.com/ford-kick-activated-tailgate/21746/; 2012). Each of these systems requires direct interaction with the vehicle at the time the user wants to open the tailgate.

BRIEF SUMMARY

Embodiments of the subject invention provide novel and advantageous methods and systems for automatically opening the tailgate of a vehicle without the need for any interaction with a smartkey (e.g., a tailgate release button on a smartkey) or the vehicle itself (e.g., no need to place a foot under the rear bumper of the vehicle, stand behind the vehicle for any amount of time, or find and press a tailgate release button on a smartkey or key fob). A tailgate in this context can refer to a tailgate or a trunk door of a vehicle (e.g., a roadworthy vehicle such as a car or truck). The vehicle can be an electric vehicle. The tailgate can be opened automatically by utilizing location data of the vehicle (e.g., the vehicle's global positioning system (GPS) location data) and remote key or smartkey proximity to the vehicle, in tandem with location data (e.g., GPS location data) of a user's mobile device. The location data of the vehicle can include coordinates, proximity to nearby businesses or other commercial locations, proximity to parking structures, and/or any data that may have been entered for routing of the vehicle to a particular destination. Mobile payment information of the mobile device can also be used. The remote key can be, for example, a wireless key fob or a Bluetooth (e.g., Bluetooth-low energy (Bluetooth-LE)) device (e.g., a mobile device, such as a smartphone, that is used to gain access to the vehicle). The key fob can be integrated with a smartkey. Embodiments of the subject invention provide useful quality-of-life improvements for users who are expecting to place objects in the trunk of a vehicle. Instead of having to manually open the tailgate, place a foot under the tailgate, press a button on a remote key fob, or press a trunk-release button on the tailgate or key fob, the tailgate will automatically open as the user approaches the vehicle.

In an embodiment, a method for automatically opening a tailgate of a vehicle can comprise: i) transmitting, by the vehicle, location information of the vehicle to a remote server after the vehicle is parked; ii) analyzing, by the remote server, commercial locations within a predetermined proximity distance of the parked vehicle; iii) transmitting to the remote server, by a mobile device of a user (e.g., driver, passenger) of the vehicle, location information of the mobile device and an indication that a transaction has occurred, after a purchase is made using a mobile payment method of the mobile device; iv) determining, by the remote server, whether a location of the transaction is within the predetermined proximity distance of the parked vehicle; v) if the location of the transaction is not within the predetermined proximity distance of the parked vehicle, returning to step iii); vi) if the location of the transaction is within the predetermined distance of the parked vehicle, notifying the mobile device such that the mobile device displays an inquiry for the user to indicate whether the tailgate of the vehicle should be automatically opened when the user returns to the vehicle; vii) transmitting to the vehicle an indication that the tailgate of the vehicle should be automatically opened when the user returns to the vehicle, if the user provides such an indication in reply to the inquiry, such that the vehicle will wait for a signal of a remote key, a smartkey, or both; and viii) automatically opening the tailgate of the vehicle when one of the following conditions (a or b) is met: a) a remote unlock signal is received by the vehicle; or b) the smartkey is detected by the vehicle within a predetermined opening distance of the vehicle.

DETAILED DESCRIPTION

Figure 1:
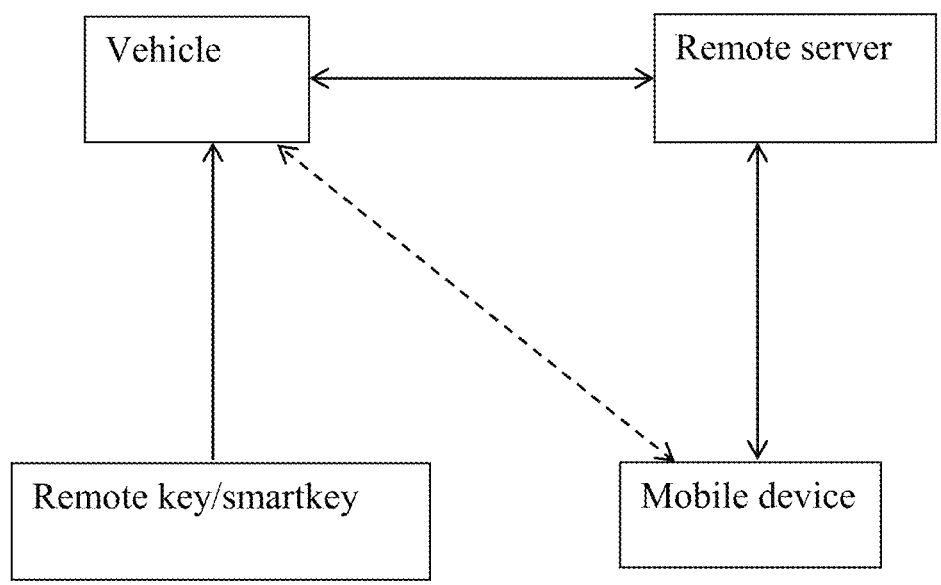
FIG. 1 shows a block diagram of a system for automatically opening the tailgate of a vehicle, according to an embodiment of the subject invention.

Embodiments of the subject invention provide novel and advantageous methods and systems for automatically opening the tailgate of a vehicle without the need for any interaction with a smartkey (e.g., a tailgate release button on a smartkey) or the vehicle itself (e.g., no need to place a foot under the rear bumper of the vehicle, stand behind the vehicle for any amount of time, or find and press a tailgate release button on a smartkey or key fob). A tailgate in this context can refer to a tailgate or a trunk door of a vehicle (e.g., a roadworthy vehicle such as a car or truck). The vehicle can be an electric vehicle. The tailgate can be opened automatically by utilizing location data of the vehicle (e.g., the vehicle's global positioning system (GPS) location data) and remote key or smartkey proximity to the vehicle, in tandem with location data (e.g., GPS location data) of a user's mobile device. The location data of the vehicle can include coordinates, proximity to nearby businesses or other commercial locations, proximity to parking structures, and/or any data that may have been entered for routing of the vehicle to a particular destination. Mobile payment information of the mobile device can also be used. The remote key can be, for example, a wireless key fob or a Bluetooth (e.g., Bluetooth-LE) device (e.g., a mobile device, such as a smartphone, that is used to gain access to the vehicle). The key fob can be integrated with a smartkey. Embodiments of the subject invention provide useful quality-of-life improvements for users who are expecting to place objects in the trunk of a vehicle. Instead of having to manually open the tailgate, place a foot under the tailgate, press a button on a remote key fob, or press a trunk-release button on the tailgate or key fob, the tailgate will automatically open as the user approaches the vehicle.

The mobile device of the user can have software (e.g., an application, such as a telematics application (e.g., a telematics application from Independent Electric Vehicles)) installed thereon for communicating with a remote server. The remote server can be, for example, a telematics server. The remote server has software installed thereon for communicating with the vehicle and the mobile device, and also has geographic information and location information for businesses and other commercial locations stored thereon. The vehicle is configured to communicate with the remote server; for example, the vehicle has been activated with a remote server service provider (e.g., a telematics service provider) and/or is enrolled in a remote server service (e.g., a telematics service). The user can authorize the mobile device software (e.g., a telematics application) to access the mobile device's location information (e.g., GPS information) and/or any other information that may be necessary for the application. The mobile device can have a mobile payment method installed thereon, including but not limited to Google Pay, Apple Pay, and/or Samsung Pay.

FIG. 1 shows a block diagram of a system for automatically opening the tailgate of a vehicle, according to an embodiment of the subject invention. Referring to FIG. 1, the communication paths between various elements are shown. The system can include a vehicle, a remote server, a mobile device, and a remote key and/or smartkey for the vehicle. The vehicle can be a roadworthy vehicle such as a car, truck, or motorcycle. The vehicle can be an electric vehicle, though embodiments are not limited thereto. The remote server can be a telematics server, though embodiments are not limited thereto. The remote key can be separate from, or integrated together with, the smartkey. The only requirement is a key that can be sensed by the vehicle when it is nearby; thus, it is possible only a remote key or a smartkey (not both) is present. The remote key (if present) can be, for example, a wireless key fob or a Bluetooth (e.g., Bluetooth-LE) device (such as the mobile device; that is, the remote key (if present) can be the same as the mobile device, though it can also be a separate mobile device from the mobile device shown in FIG. 1). The mobile device can be any mobile device that can communicate with the remote server; for example, the mobile device can be a mobile phone, such as a smartphone.

Referring still to FIG. 1, the vehicle sends data to, and receives information from, the remote server. The information transmitted from the vehicle to the remote server can include location data, such as GPS data of the vehicle. The information transmitted form the remote server to the vehicle can include an indication that the user would like the tailgate to open automatically upon the user's return to the vehicle, thereby allowing the vehicle to wait for receipt of a remote key signal and/or a smartkey to enter within a predetermined distance. The mobile device also sends data to, and receives information from, the remote server. The information transmitted from the mobile device to the remote server can include location data, such as GPS data of the mobile device, an alert that a purchase has been made using a mobile payment method on the mobile device, and/or an indication that the user would like the tailgate of the vehicle to open automatically upon the user's return to the vehicle. The information transmitted form the remote server to the mobile device can include an inquiry as to whether the user would like the tailgate of the vehicle to open automatically upon the user's return to the vehicle. The remote key and/or smartkey send information to the vehicle, in the form of a signal either informing of the proximity of the smartkey and/or a signal indicating that the user would like the doors unlocked, doors locked, tailgate opened, or an alarm to be activated (e.g., the user has pressed a button on a key fob). The vehicle and the mobile device can exchange information, though this is not necessary during the performance of a method for automatically opening the tailgate (depicted with a dotted line). For example, the software (e.g., telematics application) can communicate with software stored on a computer of the vehicle.

Figure 2:
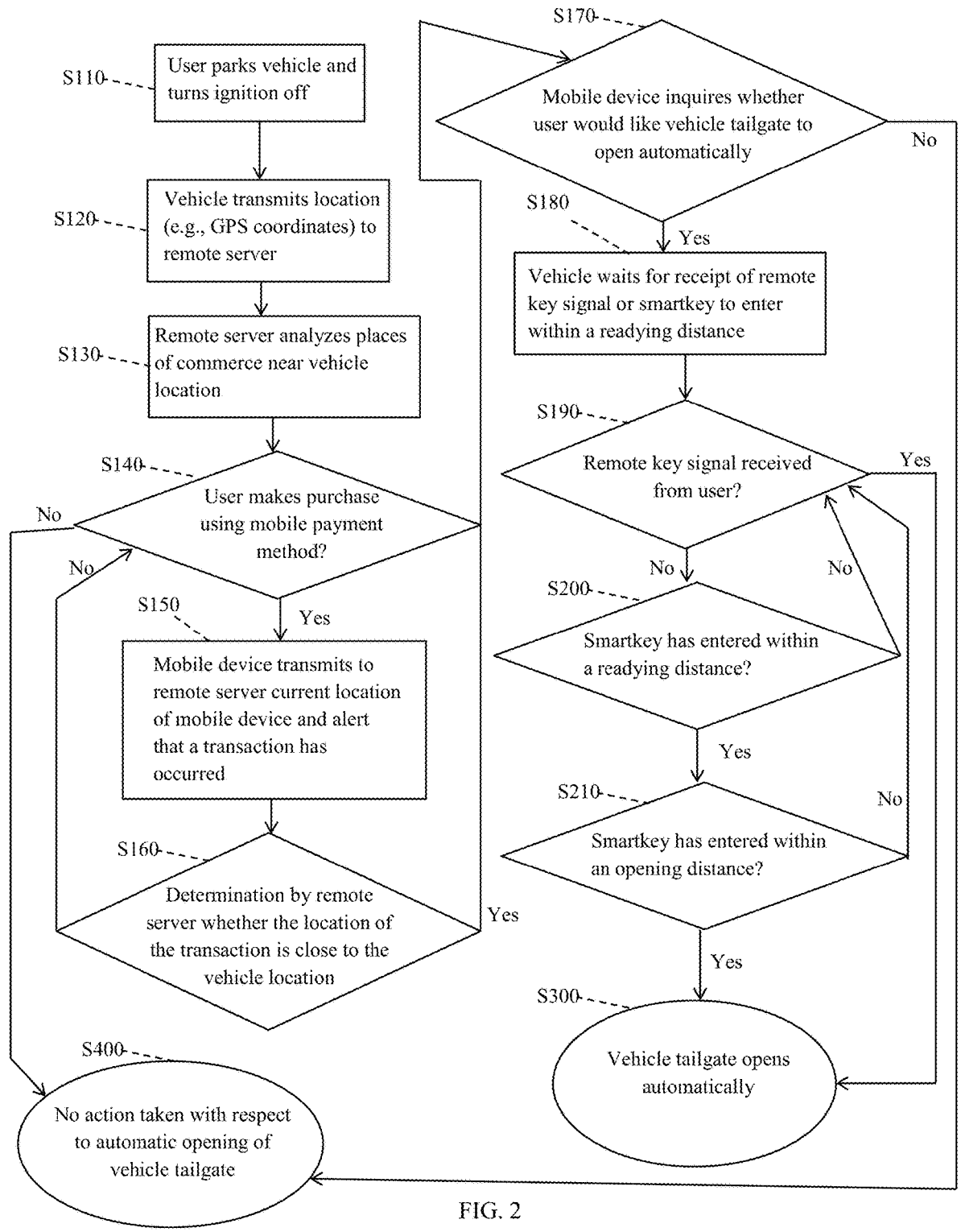
FIG. 2 shows a flow diagram of a method for automatically opening the tailgate of a vehicle, according to an embodiment of the subject invention.

FIG. 2 shows a flow diagram of a method for automatically opening the tailgate of a vehicle, according to an embodiment of the subject invention. Referring to FIG. 2, the user (e.g., driver) parks the vehicle (e.g., at a storefront, in a parking garage, in a parking lot, near a physical place of business) and turns off the ignition (step S110). The vehicle then transmits location information (e.g., GPS coordinates) of the vehicle to the remote server (step S120). The remote server analyzes places of commerce near (e.g., within a predetermined radius of) the vehicle location, and these places of commerce can be categorized as potential destinations of the user (step S130). If a navigation system of the vehicle or the mobile device was used to route the vehicle to a certain location, this information can also be considered by the remote server as a potential destination of the user (if the mobile device navigation system was used, this information can be received by the remote server directly from the mobile device or via the vehicle if the mobile device has communicated such information to the vehicle). Once the user makes a purchase using a mobile payment method of the mobile device (step S140), the mobile device transmits to the remote server current location information (e.g., GPS coordinates) of the mobile device and an alert that a transaction has occurred (step S150). The remote server determines whether the location of the transaction (i.e., the location of the mobile device when the transaction alert was received by the remote server) is close to the vehicle location (step S160). For example, the remote server can determine whether the location of the transaction was within a certain predetermined distance from the vehicle location and/or the remote server can determine whether the transaction was made at one of the potential destinations of the user categorized in step S130.

Figure 4:
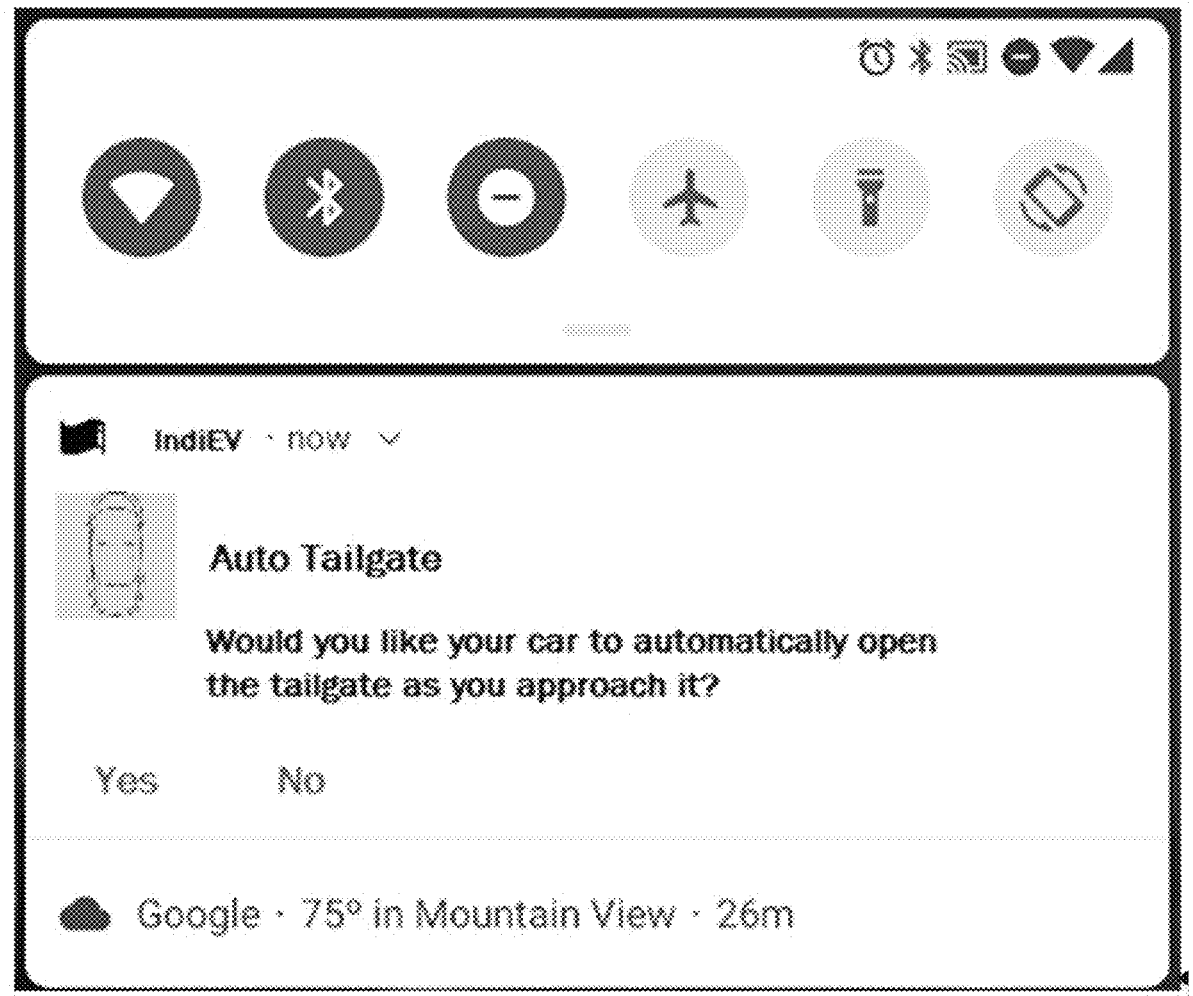
FIG. 4 shows an image of a screen shot of a message sent to a user after making a transaction, according to an embodiment of the subject invention.

If the remote server determines that the location of the transaction was not close to the vehicle location, then the method returns to step S140 and waits to see if another purchase is made. If the remote server determines that the location of the transaction was close to the vehicle location, then the remote server will notify the mobile device such that the mobile device will inquire whether the user would like the vehicle tailgate to open automatically when the user returns to the vehicle (step S170). This can be done by, for example, displaying a notification on a display of the mobile device, in response to which the user can select whether or not to have the tailgate opened automatically when the user returns to the vehicle. FIG. 4 shows a screen shot of an example of such a notification. If the user indicates that the tailgate should not be automatically opened upon returning to the vehicle, the method is ended S400 (this can be done either after sending this information to the remote server or without doing so). If the user indicates that the tailgate should be automatically opened upon returning to the vehicle, this information is transmitted to vehicle (e.g., via the remote server), and the vehicle then waits/listens for the remote key and/or smartkey (step S180). The user can make the indication by, for example, selecting yes or no in reply to a notification (e.g., by tapping yes or no on a touch screen display).

Figure 3:
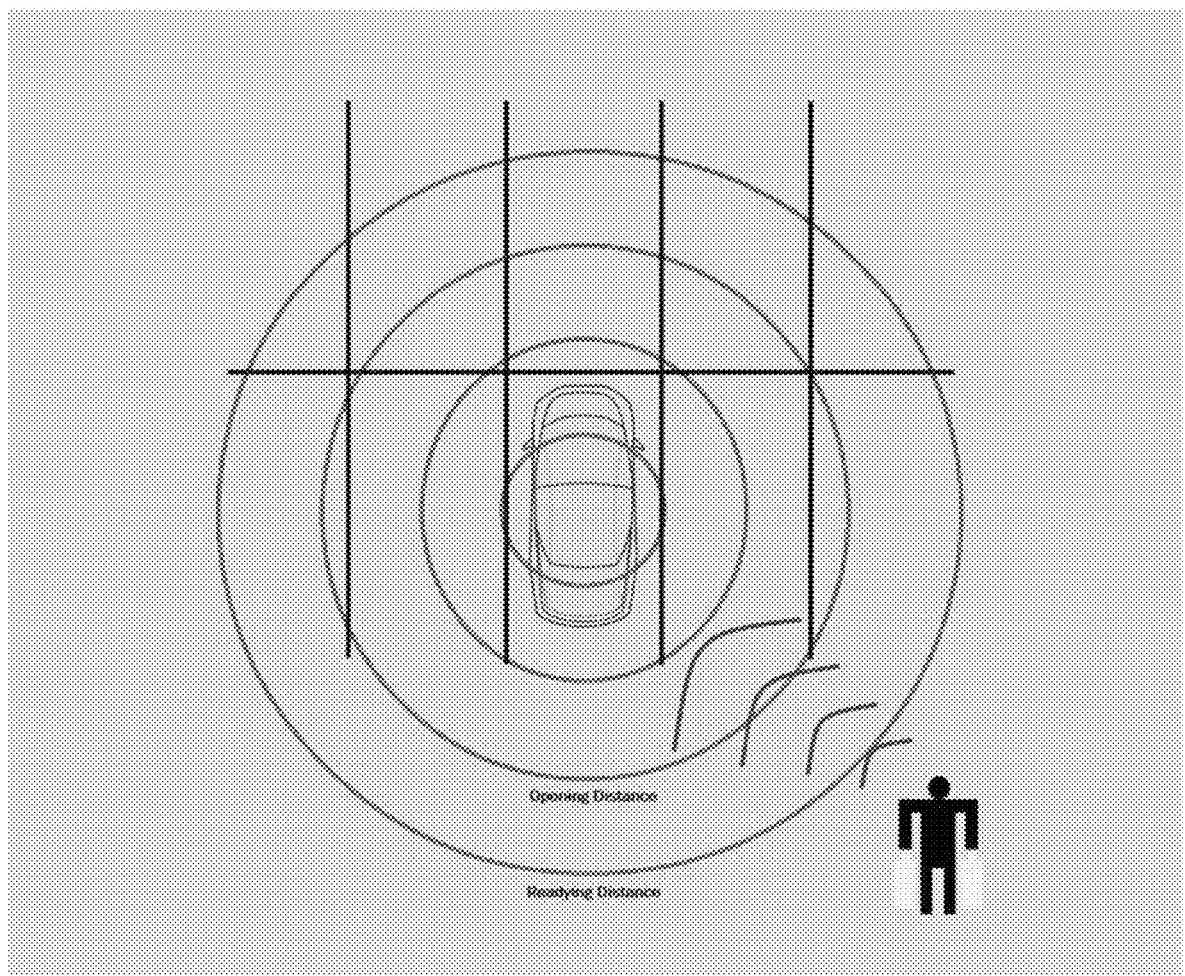
FIG. 3 shows a schematic diagram of a readying distance and an opening distance of a user, relative to a vehicle, according to an embodiment of the subject invention.

If a remote key signal is received by the vehicle (e.g., the user presses the unlock button on a key fob), then the vehicle tailgate will automatically open at that time (steps S190 and S300). If the vehicle (e.g., a smartkey module on the vehicle) detects the smartkey within a predetermined first distance, which can be referred to as a readying distance, the vehicle will then wait and check to see if the smartkey enters within a predetermined second distance, which can be referred to as an opening distance (steps S200 and S210). If the user enters the readying distance but not the opening distance (e.g., if the user walks past the vehicle or is even still inside a commercial location but close enough to the parked location of the vehicle), then the vehicle will continue to wait/listen for the remote key and/or smartkey (steps S190, S200, S210). If the user enters the opening distance, the vehicle tailgate will automatically open at that time (steps S210 and S300). FIG. 3 shows a schematic diagram of an example readying distance and opening distance of the user, relative to the vehicle. The user is at the bottom right-hand portion of FIG. 3 and is shown carrying two bags, and the vehicle is at the center of FIG. 3 and is shown in a parking space (the grid in FIG. 3). The readying distance is represented by the largest circle emanating from the center of the vehicle, and the opening distance is represented by the second-largest circle emanating from the center of the vehicle. The curved lines from the user to the vehicle represent the signal(s) being sent by the remote key and/or smartkey. It should be noted that step 200 is not necessary in some embodiments of the subject invention. That is, the method can be performed without checking for a readying distance and skipping ahead to checking for the opening distance. It is also noted that, if a remote key signal as discussed herein (e.g., a pressing of the unlock button on a key fob) is received by the vehicle after the smartkey has entered the readying distance but before the smartkey has entered the opening distance, the tailgate will automatically open at that time.

If no purchase is made by the user (that is determined to be close enough to the vehicle at step S160, or if no purchase is made at all) using a mobile payment method on the mobile device prior to returning to the vehicle and turning the ignition on, the method is ended S400 and can be started again when the vehicle is parked and the ignition is turned off. That is, if the answer at step S140 remains no until the user returns to the vehicle and turns the ignition on, then the method is ended S400.

In a further embodiment, the remote server can recognize patterns in user behavior (e.g., patterns in the user's commonly occurring and repeated trips to certain locations on certain days of the week (for example, if the user always parks in a particular lot and makes a mobile payment at a particular store every Saturday)). Thus, if the user has consistently indicated that the tailgate should be automatically opened after a particular type of repeated purchase, the remote server can communicate with the vehicle to always open the tailgate when the user approaches after making such a purchase without the need for the user to affirm the desire to have the tailgate automatically open (e.g., by interacting with the software of the mobile device). This pattern recognition and/or automatic opening without user affirmation based on patterns can be disabled by the user (e.g., via the software on the mobile device).

In an embodiment, the purchase does not have to be made with a mobile payment method of the mobile device and, in fact, a purchase does not have to be made at all. Instead, the user can indicate, via the software on the mobile device, that the tailgate should be opened automatically when the user returns to the vehicle (e.g., when the conditions of steps S190 and/or S210 of FIG. 2 are satisfied) even though no purchase has been made with a mobile payment method of the mobile device. For example, if a purchase is made with cash but the user would still like the tailgate to be opened automatically upon returning to the vehicle.

As discussed herein, to be considered as a potential destination of the user and/or to be considered close enough to the vehicle for a purchase at a business to warrant an inquiry to the user about opening the tailgate, a place of commerce must be within a predetermined distance of the vehicle. This predetermined distance can be, for example, any of the following values, at least any of the following values, about any of the following values, no more than any of the following values, or within any range having any of the following values as endpoints (all values are in miles): 0.1, 0.2, 0.3, 0.4, 0.5, 0.6, 0.7, 0.8, 0.9, 1, 1.25, 1.5, 1.75, 2, 2.5, 3, 3.5, 4, 4.5, 5, 6, 7, 8, 9, or 10. The opening distance (see also FIG. 3 and step S210 in FIG. 2) can be, for example, any of the following values, at least any of the following values, about any of the following values, no more than any of the following values, or within any range having any of the following values as endpoints (all values are in feet): 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 21, 22, 23, 24, 25, 26, 27, 28, 29, 30, 35, 40, 45, 50, 55, 60, 65, 70, 75, 80, 85, 90, 95, or 100. The readying distance (see also FIG. 3 and step S200 in FIG. 2) can be, for example, any of the following values, at least any of the following values, about any of the following values, no more than any of the following values, or within any range having any of the following values as endpoints (all values are in feet), 10, 11, 12, 13, 14, 15, 16, 17, 18, 19, 20, 21, 22, 23, 24, 25, 26, 27, 28, 29, 30, 35, 40, 45, 50, 55, 60, 65, 70, 75, 80, 85, 90, 95, 100, 110, 120, 130, 140, 150, or 200.

Embodiments of the subject invention advantageously allow a user to freely approach a vehicle knowing that the tailgate will open without any interaction with the smartkey or the vehicle itself (and no interaction with a remote key is required, though the door unlock button on a key fob can be used to open the tailgate if desired). Thus, the user does not need to place a foot under the rear bumper of the vehicle, stand behind the vehicle for any amount of time, or find and press a trunk/tailgate release button on a key fob to access the trunk. The inquiry by the mobile device will also be easily seen because the user will have just used the mobile device to make a payment with a mobile payment method. The systems and method of embodiments of the subject invention provide an improved level of convenience over related art systems and methods for opening vehicle tailgates.

The methods, systems, and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals (i.e., computer-readable media can be referred to as non-transitory). A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1. A method for automatically opening a tailgate of a vehicle, the method comprising:

i) transmitting, by the vehicle, location information of the vehicle to a remote server after the vehicle is parked;

ii) analyzing, by the remote server, commercial locations within a predetermined proximity distance of the parked vehicle;

iii) transmitting to the remote server, by a mobile device of a user of the vehicle, location information of the mobile device and an indication that a transaction has occurred, after a purchase is made using a mobile payment method of the mobile device;

iv) determining, by the remote server, whether a location of the transaction is within the predetermined proximity distance of the parked vehicle;

v) if the location of the transaction is not within the predetermined proximity distance of the parked vehicle, returning to step iii);

vi) if the location of the transaction is within the predetermined distance of the parked vehicle, notifying the mobile device such that the mobile device displays an inquiry for the user to indicate whether the tailgate of the vehicle should be automatically opened when the user returns to the vehicle;

vii) transmitting to the vehicle an indication that the tailgate of the vehicle should be automatically opened when the user returns to the vehicle, if the user provides such an indication in reply to the inquiry, such that the vehicle will wait for a signal of a remote key and/or smartkey; and viii) automatically opening the tailgate of the vehicle (e.g., without any interaction of the user with the vehicle or any period of time of the user waiting near the vehicle) when one of the following conditions is met:
  a) a remote unlock signal is received by the vehicle (e.g., an unlock signal after an unlock button (this refers to a door unlock button, not a trunk release button), is pressed on a key fob); or
  b) the smartkey is detected by the vehicle within a predetermined opening distance of the vehicle.

Embodiment 2. The method according to embodiment 1, wherein if the user provides an indication, in reply to the inquiry, that the tailgate of the vehicle should not be automatically opened when the user returns to the vehicle, steps vii) and viii) are skipped and the method is ended.

Embodiment 3. The method according to any of embodiments 1-2, wherein, before the smartkey is detected by the vehicle within a predetermined opening distance of the vehicle, the vehicle first detects the smartkey within a predetermined readying distance of the vehicle.

Embodiment 4. The method according to embodiment 3, wherein the predetermined readying distance is 100 feet.

Embodiment 5. The method according to any of embodiments 1-4, wherein the predetermined opening distance is 25 feet.

Embodiment 6. The method according to any of embodiments 1-5, wherein the predetermined proximity distance is 1.5 miles.

Embodiment 7. The method according to any of embodiments 1-6, wherein the location information of the vehicle comprises global positioning system (GPS) coordinates of the vehicle.

Embodiment 8. The method according to any of embodiments 1-7, wherein the location information of the mobile device comprises GPS coordinates of the mobile device.

Embodiment 9. The method according to any of embodiments 1-8, wherein the vehicle is a roadworthy car, truck, or motorcycle.

Embodiment 10. The method according to any of embodiments 1-9, wherein the vehicle is an electric vehicle.

Embodiment 11. The method according to any of embodiments 1-10, wherein the remote key is integrated together with the smartkey.

Embodiment 12. The method according to any of embodiments 1-11, wherein the remote key comprises a wireless key fob.

Embodiment 13. The method according to any of embodiments 1-12, wherein the mobile device is a mobile phone.

Embodiment 14. The method according to any of embodiments 1-13, wherein the mobile device is a smartphone.

Embodiment 15. The method according to any of embodiments 1-14, wherein the mobile payment method comprises Apple Pay, Google Pay, or Samsung Pay.

Embodiment 16. The method according to any of embodiments 1-15, wherein the user provides the indication, that the tailgate of the vehicle should be automatically opened when the user returns to the vehicle or the indication that the tailgate of the vehicle should not be automatically opened when the user returns to the vehicle, by selecting yes or no in reply to the inquiry.

Embodiment 17. The method according to embodiment 16, wherein the selecting yes or no in reply to the inquiry comprises tapping a touch screen display of the mobile device.

Embodiment 18. The method according to any of embodiments 1-17, wherein the remote server is a telematics server.

Embodiment 19. The method according to any of embodiments 1-18, wherein the mobile device comprises an application stored thereon for communicating with (e.g., configured to communicate with) the remote server.

Embodiment 20. The method according to embodiment 19, wherein the application is a telematics application.

Embodiment 21. The method according to any of embodiments 19-20, wherein the user has authorized the application to access the location information of the mobile device.

Embodiment 22. The method according to any of embodiments 1-21, wherein the remote server comprises software stored thereon for communicating with (e.g., configured to communicate with) the vehicle and the mobile device.

Embodiment 23. The method according to any of embodiments 1-22, wherein the remote server comprises geographic information and location information for commercial locations stored thereon.

Embodiment 24. The method according to any of embodiments 1-23, wherein the vehicle has been activated with a remote server service provider and/or is enrolled in a remote server service.

Embodiment 25. The method according to embodiment 24, wherein the remote server service provider is a telematics service provider and the remote server service is a telematics service.

Embodiment 26. A system for automatically opening a tailgate of a vehicle, the system comprising:
  a smartkey configured to operate the vehicle; and
  a mobile device comprising a processor and having an application stored thereon for communicating with (e.g., configured to communicate with) a remote server, the remote server being configured to: receive location information of the vehicle after the vehicle is parked and analyze commercial locations within a predetermined proximity distance of the parked vehicle,
  wherein, when executed by the processor, the application causes the mobile device to:
    transmit to the remote server location information of the mobile device and an indication that a transaction has occurred, after a purchase is made using a mobile payment method of the mobile device, the remote server determining whether a location of the transaction is within the predetermined proximity distance of the parked vehicle and notifying the mobile device when the location of the transaction is within the predetermined proximity distance;
    after receiving notification that the location of the transaction is within the predetermined proximity distance, display an inquiry for a user of the mobile device to indicate whether the tailgate of the vehicle should be automatically opened when the user returns to the vehicle, such that the vehicle receives (e.g., from the mobile device directly or via the remote server) an indication that the tailgate of the vehicle should be automatically opened when the user returns to the vehicle, if the user provides such an indication in reply to the inquiry, such that the vehicle will wait for a signal of a remote key and/or the smartkey and automatically open the tailgate of the vehicle (e.g., without any interaction of the user with the vehicle or any period of time of the user waiting near the vehicle) when one of conditions a) or b) is met:
      a) a remote unlock signal is received by the vehicle (e.g., an unlock signal after an unlock button (this refers to a door unlock button, not a trunk release button), is pressed on a key fob); or
      b) the smartkey is detected by the vehicle within a predetermined opening distance of the vehicle.

Embodiment 27. The system according to embodiment 26, wherein if the user provides an indication, in reply to the inquiry, that the tailgate of the vehicle should not be automatically opened when the user returns to the vehicle, the vehicle tailgate does not automatically open when either of conditions a) or b) is met.

Embodiment 28. The system according to any of embodiments 26-27, wherein, before the smartkey is detected by the vehicle within a predetermined opening distance of the vehicle, the vehicle first detects the smartkey within a predetermined readying distance of the vehicle.

Embodiment 29. The system according to embodiment 28, wherein the predetermined readying distance is 100 feet.

Embodiment 30. The system according to any of embodiments 26-29, wherein the predetermined opening distance is 25 feet.

Embodiment 31. The system according to any of embodiments 26-30, wherein the predetermined proximity distance is 1.5 miles.

Embodiment 32. The system according to any of embodiments 26-31, wherein the location information of the vehicle comprises global positioning system (GPS) coordinates of the vehicle.

Embodiment 33. The system according to any of embodiments 26-32, wherein the location information of the mobile device comprises GPS coordinates of the mobile device.

Embodiment 34. The system according to any of embodiments 26-33, wherein the vehicle is a roadworthy car, truck, or motorcycle.

Embodiment 35. The system according to any of embodiments 26-34, wherein the vehicle is an electric vehicle.

Embodiment 36. The system according to any of embodiments 26-35, wherein the remote key is integrated together with the smartkey.

Embodiment 37. The system according to any of embodiments 26-36, wherein the remote key comprises a wireless key fob.

Embodiment 38. The system according to any of embodiments 26-37, wherein the mobile device is a mobile phone.

Embodiment 39. The system according to any of embodiments 26-38, wherein the mobile device is a smartphone.

Embodiment 40. The system according to any of embodiments 26-39, wherein the mobile payment method comprises Apple Pay, Google Pay, or Samsung Pay.

Embodiment 41. The system according to any of embodiments 26-40, wherein the user provides the indication, that the tailgate of the vehicle should be automatically opened when the user returns to the vehicle or the indication that the tailgate of the vehicle should not be automatically opened when the user returns to the vehicle, by selecting yes or no in reply to the inquiry.

Embodiment 42. The system according to embodiment 41, wherein the selecting yes or no in reply to the inquiry comprises tapping a touch screen display of the mobile device.

Embodiment 43. The system according to any of embodiments 26-42, wherein the remote server is a telematics server.

Embodiment 44. The system according to any of embodiments 26-43, wherein the application is a telematics application.

Embodiment 45. The system according to any of embodiments 26-44, wherein the user has authorized the application to access the location information of the mobile device.

Embodiment 46. The system according to any of embodiments 26-45, wherein the remote server comprises software stored thereon for communicating with (e.g., configured to communicate with) the vehicle and the mobile device.

Embodiment 47. The system according to any of embodiments 26-46, wherein the remote server comprises geographic information and location information for commercial locations stored thereon.

Embodiment 48. The system according to any of embodiments 26-47, wherein the vehicle has been activated with a remote server service provider and/or is enrolled in a remote server service.

Embodiment 49. The system according to embodiment 48, wherein the remote server service provider is a telematics service provider and the remote server service is a telematics service.

Embodiment 50. The system according to any of embodiments 26-49, wherein the system comprises the remote server.

Embodiment 51. The system according to any of embodiments 26-50, wherein the system comprises the vehicle.

Embodiment 52. The method according to any of embodiments 1-25 or the system according to any of embodiments 26-51, wherein the remote key is a Bluetooth (e.g., Bluetooth-LE) device (e.g., a smartphone that is used to gain access to the vehicle).

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method for automatically opening a tailgate of a vehicle, the method comprising:
   i) transmitting, by the vehicle, location information of the vehicle to a remote server after the vehicle is parked;
   ii) analyzing, by the remote server, commercial locations within a predetermined proximity distance of the parked vehicle;
   iii) transmitting to the remote server, by a mobile device of a user of the vehicle, location information of the mobile device and an indication that a transaction has occurred, after a purchase is made using a mobile payment method of the mobile device;
   iv) determining, by the remote server, whether a location of the transaction is within the predetermined proximity distance of the parked vehicle;
   v) if the location of the transaction is not within the predetermined proximity distance of the parked vehicle, returning to step iii);
   vi) if the location of the transaction is within the predetermined distance of the parked vehicle, notifying the mobile device such that the mobile device displays an inquiry for the user to indicate whether the tailgate of the vehicle should be automatically opened when the user returns to the vehicle;
   vii) transmitting to the vehicle an indication that the tailgate of the vehicle should be automatically opened when the user returns to the vehicle, if the user provides such an indication in reply to the inquiry, such that the vehicle will wait for a signal of a remote key, a smartkey, or both; and
   viii) automatically opening the tailgate of the vehicle when one of the following conditions is met:
      a) a remote unlock signal is received by the vehicle; or
      b) the smartkey is detected by the vehicle within a predetermined opening distance of the vehicle.

2. The method according to claim 1, wherein if the user provides an indication, in reply to the inquiry, that the tailgate of the vehicle should not be automatically opened when the user returns to the vehicle, steps vii) and viii) are skipped and the method is ended.

3. The method according to claim 1, wherein, before the smartkey is detected by the vehicle within a predetermined opening distance of the vehicle, the vehicle first detects the smartkey within a predetermined readying distance of the vehicle.

4. The method according to claim 3, wherein the predetermined readying distance is 100 feet.

5. The method according to claim 1, wherein the predetermined opening distance is 25 feet.

6. The method according to claim 1, wherein the predetermined proximity distance is 1.5 miles.

7. The method according to claim 1, wherein the location information of the vehicle comprises global positioning system (GPS) coordinates of the vehicle, and
   wherein the location information of the mobile device comprises GPS coordinates of the mobile device.

8. The method according to claim 1, wherein the vehicle is a roadworthy car, truck, or motorcycle.

9. The method according to claim 1, wherein the vehicle is a roadworthy electric car, electric truck, or electric motorcycle.

10. The method according to claim 1, wherein the remote key is integrated together with the smartkey.

11. The method according to claim 1, wherein the remote key comprises a wireless key fob or a Bluetooth device.

12. The method according to claim 1, wherein the mobile device is a smartphone.

13. The method according to claim 12, wherein the user provides the indication, that the tailgate of the vehicle should be automatically opened when the user returns to the vehicle or the indication that the tailgate of the vehicle should not be automatically opened when the user returns to the vehicle, by selecting yes or no in reply to the inquiry, and
   wherein the selecting yes or no in reply to the inquiry comprises tapping a touch screen display of the mobile device.

14. The method according to claim 1, wherein the remote server is a telematics server,
   wherein the mobile device comprises an application stored thereon for communicating with the remote server, and
   wherein the user has authorized the application to access the location information of the mobile device.

15. The method according to claim 14, wherein the application is a telematics application.

16. The method according to claim 1, wherein the vehicle: has been activated with a remote server service provider; is enrolled in a remote server service; or both.

17. The method according to claim 16, wherein the remote server service provider is a telematics service provider and the remote server service is a telematics service.

18. The method according to claim 1, wherein if the user provides an indication, in reply to the inquiry, that the tailgate of the vehicle should not be automatically opened when the user returns to the vehicle, steps vii) and viii) are skipped and the method is ended,
   wherein, before the smartkey is detected by the vehicle within a predetermined opening distance of the vehicle, the vehicle first detects the smartkey within a predetermined readying distance of the vehicle,
   wherein the predetermined readying distance is 100 feet,
   wherein the predetermined opening distance is 25 feet,
   wherein the predetermined proximity distance is 1.5 miles,
   wherein the location information of the vehicle comprises GPS coordinates of the vehicle,
   wherein the location information of the mobile device comprises GPS coordinates of the mobile device, wherein the vehicle is a roadworthy electric car, electric truck, or electric motorcycle, wherein the mobile device is a smartphone, wherein the user provides the indication, that the tailgate of the vehicle should be automatically opened when the user returns to the vehicle or the indication that the tailgate of the vehicle should not be automatically opened when the user returns to the vehicle, by selecting yes or no in reply to the inquiry, wherein the selecting yes or no in reply to the inquiry comprises tapping a touch screen display of the mobile device, wherein the remote server is a telematics server, wherein the mobile device comprises an application stored thereon for communicating with the remote server, wherein the user has authorized the application to access the location information of the mobile device, wherein the application is a telematics application, wherein the vehicle: has been activated with a remote server service provider; is enrolled in a remote server service; or both, and wherein the remote server service provider is a telematics service provider and the remote server service is a telematics service.

19. A system for automatically opening a tailgate of a vehicle, the system comprising:

a smartkey configured to operate the vehicle; and a mobile device comprising a processor and having an application stored thereon configured to communicate with a remote server, the remote server being configured to: receive location information of the vehicle after the vehicle is parked and analyze commercial locations within a predetermined proximity distance of the parked vehicle, wherein, when executed by the processor, the application causes the mobile device to:

transmit to the remote server location information of the mobile device and an indication that a transaction has occurred, after a purchase is made using a mobile payment method of the mobile device, the remote server determining whether a location of the transaction is within the predetermined proximity distance of the parked vehicle and notifying the mobile device when the location of the transaction is within the predetermined proximity distance;

after receiving notification that the location of the transaction is within the predetermined proximity distance, display an inquiry for a user of the mobile device to indicate whether the tailgate of the vehicle should be automatically opened when the user returns to the vehicle, such that the vehicle receives an indication that the tailgate of the vehicle should be automatically opened when the user returns to the vehicle, if the user provides such an indication in reply to the inquiry, such that the vehicle will wait for a signal of a remote key and/or the smartkey and automatically open the tailgate of the vehicle when one of conditions a) or b) is met:

a) a remote unlock signal is received by the vehicle; or b) the smartkey is detected by the vehicle within a predetermined opening distance of the vehicle.

20. The system according to claim 19, wherein if the user provides an indication, in reply to the inquiry, that the tailgate of the vehicle should not be automatically opened when the user returns to the vehicle, the vehicle tailgate does not automatically open when either of conditions a) or b) is met, wherein, before the smartkey is detected by the vehicle within a predetermined opening distance of the vehicle, the vehicle first detects the smartkey within a predetermined readying distance of the vehicle, wherein the predetermined readying distance is 100 feet, wherein the predetermined opening distance is 25 feet, wherein the predetermined proximity distance is 1.5 miles, wherein the location information of the vehicle comprises global positioning system (GPS) coordinates of the vehicle, wherein the location information of the mobile device comprises GPS coordinates of the mobile device, wherein the vehicle is a roadworthy electric car, electric truck, or electric motorcycle.

wherein the mobile device is a smartphone, wherein the user provides the indication, that the tailgate of the vehicle should be automatically opened when the user returns to the vehicle or the indication that the tailgate of the vehicle should not be automatically opened when the user returns to the vehicle, by selecting yes or no in reply to the inquiry, wherein the selecting yes or no in reply to the inquiry comprises tapping a touch screen display of the mobile device, wherein the remote server is a telematics server, wherein the application is a telematics application, wherein the user has authorized the application to access the location information of the mobile device, wherein the vehicle: has been activated with a remote server service provider; is enrolled in a remote server service; or both, wherein the remote server service provider is a telematics service provider and the remote server service is a telematics service, and wherein the system comprises the remote server and the vehicle.

* * * * *